(12) United States Patent
Hayakawa

(10) Patent No.: US 7,201,151 B2
(45) Date of Patent: Apr. 10, 2007

(54) FUEL TANK UNIT

(75) Inventor: Masaharu Hayakawa, Obu (JP)

(73) Assignee: Aisan Kogyo Kabushiki Kaisha, Aichi-ken (JP)

( * ) Notice: Subject to any disclaimer, the term of this patent is extended or adjusted under 35 U.S.C. 154(b) by 9 days.

(21) Appl. No.: 11/184,947

(22) Filed: Jul. 20, 2005

(65) Prior Publication Data
US 2006/0016485 A1 Jan. 26, 2006

(30) Foreign Application Priority Data
Jul. 20, 2004 (JP) ............................. 2004-210978

(51) Int. Cl.
F02M 37/04 (2006.01)
(52) U.S. Cl. ..................................... 123/509
(58) Field of Classification Search ................. 123/509
See application file for complete search history.

(56) References Cited

U.S. PATENT DOCUMENTS

| 3,659,965 | A | * | 5/1972 | Ebert et al. ............... 417/363 |
| 4,651,701 | A | * | 3/1987 | Weaver ..................... 123/509 |
| 4,750,513 | A | | 6/1988 | Griffin et al. |
| 4,844,621 | A | | 7/1989 | Umemura et al. |
| 4,869,225 | A | * | 9/1989 | Nagata et al. .............. 123/509 |
| 5,016,670 | A | | 5/1991 | Sasaki et al. |
| 5,931,353 | A | * | 8/1999 | Guyomard et al. ......... 222/385 |
| 2003/0102035 | A1 | | 6/2003 | Dasilva et al. |
| 2004/0140257 | A1 | * | 7/2004 | Dockery et al. ......... 210/416.4 |

FOREIGN PATENT DOCUMENTS

| DE | 3920276 | 1/1990 |
| DE | 10355689 | 7/2005 |
| EP | 0379631 | 8/1990 |
| JP | 5305827 | 11/1993 |
| JP | 8225023 | 9/1996 |
| WO | 03062627 | 7/2003 |

* cited by examiner

Primary Examiner—Thomas Moulis
(74) Attorney, Agent, or Firm—Dennison, Schultz & MacDonald

(57) ABSTRACT

A fuel tank unit including a fuel tank, a fuel pump, and a pad. The fuel pump may be attached to the bottom of the inside of the fuel tank, and the pad is preferably positioned between the fuel tank and the fuel pump, and may be made from rubber. The fuel tank may have a flat-box shaped exterior, and at least a portion of the top circumferential edge of the outside may be beveled, with a lid located in the beveled region. The fuel pump may be located substantially at the center of the inside bottom of the fuel tank.

11 Claims, 9 Drawing Sheets

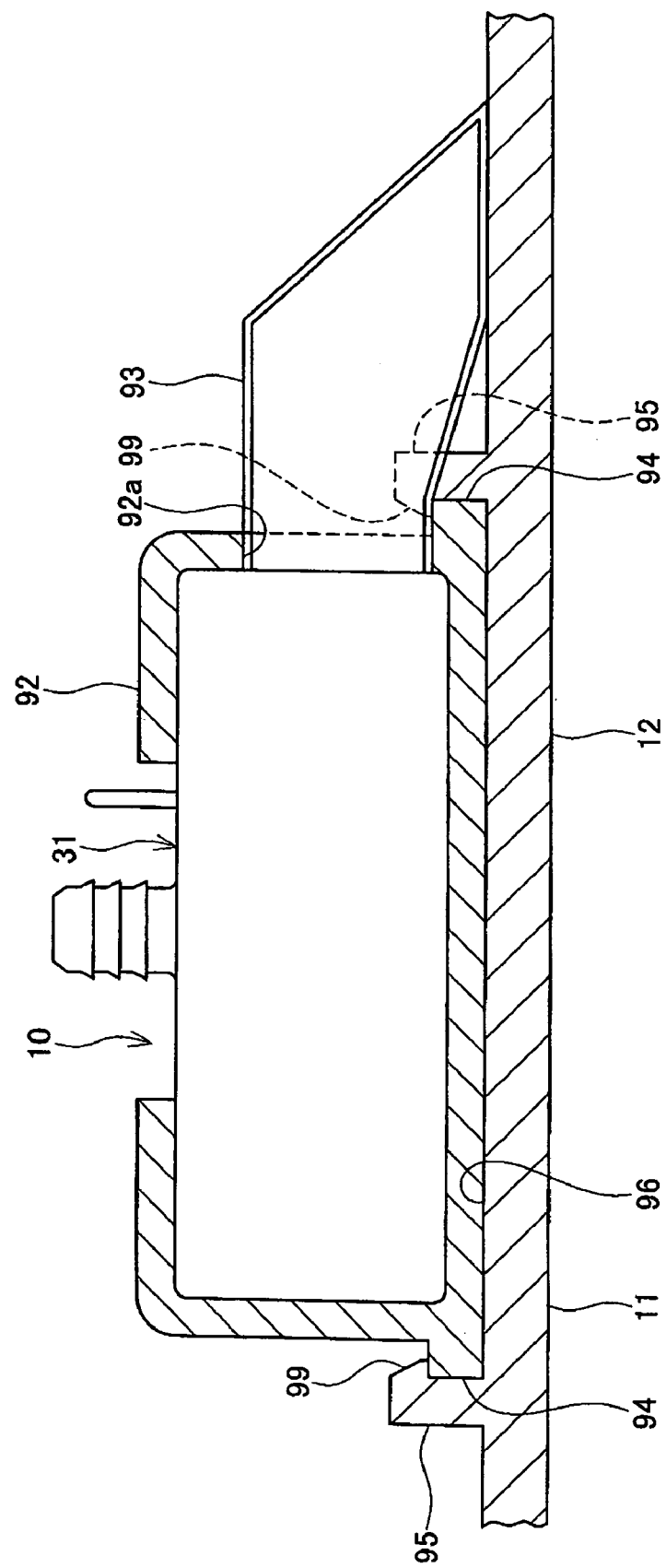

FUEL TANK UNIT

CROSS-REFERENCE TO RELATED APPLICATION

This application claims priority to Japanese Patent application number 2004-210978, filed on Jul. 20, 2004, the contents of which are hereby incorporated by reference as if fully set forth herein.

BACKGROUND OF THE INVENTION

1. Field of the Invention

The present invention relates to a fuel tank unit having a fuel tank and a fuel pump, and more particularly to technology to attach the fuel pump to the fuel tank.

2. Description of the Related Art

Japanese Laid-open Patent Publication No. 5-305827 describes a fuel tank unit. This fuel tank unit comprises a fuel tank and a fuel pump disposed within the fuel tank. The fuel pump supplies fuel from the fuel tank to an internal combustion engine of a vehicle. When the vehicle goes around a curve or during rapid starting or stopping, the level of the fuel in the fuel tank will change dramatically. Therefore, the fuel pump is located at the bottom in the center of the fuel tank where the depth of the fuel is stable even when the level of the fuel in the fuel tank changes dramatically. The fuel pump is mounted on one end of a pump support member, and positioned at the center of the bottom of the fuel tank. The other end of the pump support member is attached to the lid on the top of the fuel tank.

BRIEF SUMMARY OF THE INVENTION

Improving comfort in vehicles, demands for flattening the fuel tank and conserving the space above the fuel tank have been steadily increasing in recent years. The lid of the fuel tank has a union and a connector protruding and facing outward, with a fuel supply line is connected to the union, and a wire harness which supplies electrical power to the fuel pump connected to the connector. Space is required above the lid in order to arrange the union, the connector, the fuel supply line, and the harness. Conventionally, with a construction where the lid is located above the fuel tank, the space above the fuel tank cannot be conserved.

Accordingly, it is one object of the present teachings to provide a fuel tank unit which can conserve the space above the fuel tank.

In one aspect of the present teachings, fuel tank unit may comprise a fuel tank, a fuel pump, and a pad. The fuel pump may be attached to the bottom of the inside of the fuel tank. The pad is preferably located between the fuel tank and the fuel pump. The pad is preferably made of resin material (e.g., plastic). The fuel tank may have a flat box shape exterior. Preferably, at least a part of the top circumferential edge of the outside of the fuel tank is beveled. The fuel tank may have a lid in the region where the edge has been beveled. The fuel pump may be located substantially in the center of the inside bottom of the fuel tank. The space above the fuel tank can be conserved by having the lid at the location where the edge on outside of the fuel tank has been beveled.

If the lid is located in the region where the edge of the outside of the fuel tank has been beveled and the fuel pump is located in the center of the bottom of the fuel tank, the length of the pump support member must be longer than if the lid is located on the top surface of the fuel tank. A flat fuel tank enhances this tendency. The rigidity of the pump support member decreases as the length increases. If the rigidity of the pump support member is low, the fuel pump itself will vibrate strongly when operating. If the fuel pump vibrates strongly, the vibrations will be transferred to the vehicle through the pump support member and cause a large noise. Rashly increasing the rigidity of the pump support member is impractical because of the cost or the like. The fuel tank unit comprises a pad which is located between the fuel tank and the fuel pump. Therefore, a pump support member which is attached to the lid and supports the fuel pump is not necessary. Therefore, there will not be a loud noise from the fuel pump caused by the low rigidity of the fuel pump member. Furthermore, the noise produced by the fuel pump can be reduced by the vibration absorbing effect of the pad.

In another aspect of the present teachings, the fuel pump may have a substantially disc shaped impeller and a casing which rotatably accommodates the impeller. The pad may be formed as a sheet. The casing of the fuel pump may be attached to the top surface of the pad. With a fuel tank unit with this type of construction, the vibration transferred from the fuel pump casing to the fuel tank is effectively suppressed by the pad.

The inside surface of the casing of the fuel pump may have a fuel intake opening. The fuel pump may be attached to the fuel tank by the attracting action of a magnetic located in the bottom of the fuel tank.

In another aspect of the present teachings, a recess may be formed on one side of the fuel tank and pad. A protrusion may be formed on the other side of the fuel tank and pad. The pad may be attached to the fuel tank by press fitting the protrusion into the recess.

In another aspect of the present teachings, a hook accepting unit may be formed on one side of the fuel tank and pad. A hook may be established on the other side of the fuel tank and pad. The pad may be attached to the fuel tank by hooking the hook into the hook accepting unit.

In another aspect of the present teachings, the fuel tank may have a member for determining the position of the pad. The member may be formed in the bottom of the fuel tank. If the member is formed to position the pad in the bottom of the fuel tank, positioning will be simplified when the fuel pump is to be attached inside the fuel tank.

These aspects and features may be utilized singularly or, in combination, in order to make improved fuel pump. In addition, other objects, features and advantages of the present teachings will be readily understood after reading the following detailed description together with the accompanying drawings and claims. Of course, the additional features and aspects disclosed herein also may be utilized singularly or, in combination with the above-described aspect and features.

BRIEF DESCRIPTION OF THE DRAWINGS

FIG. 9 is a vertical cross section diagram of a fuel pump and fuel tank of a sixth representative embodiment of the present teachings.

DETAILED DESCRIPTION OF THE PREFERRED EMBODIMENTS

[First Representative Embodiment]

Figure 1:
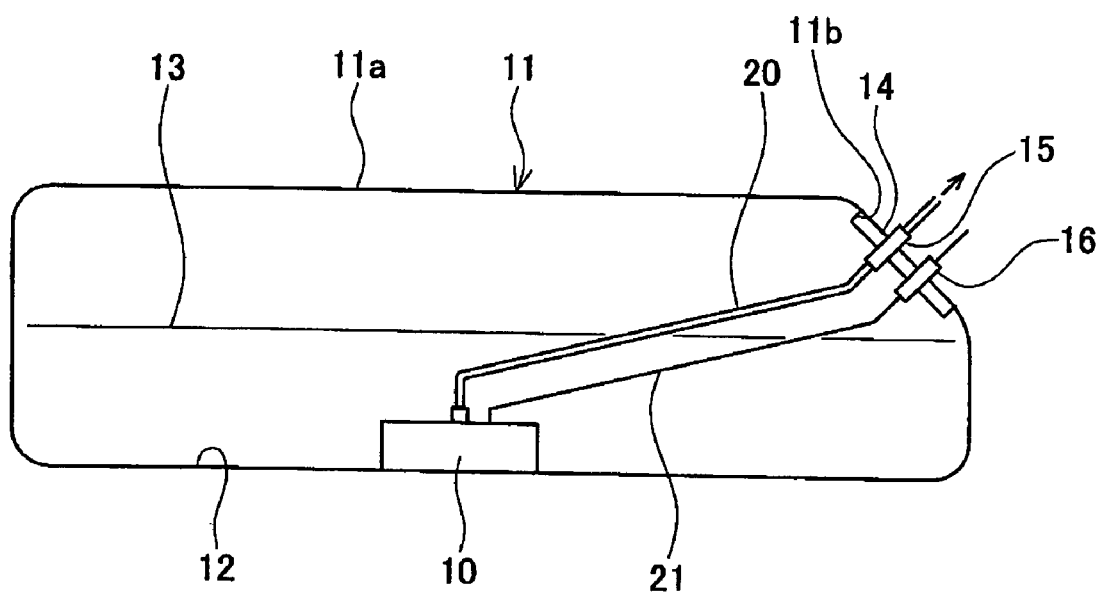
FIG. 1 is an internal component diagram of a fuel tank unit of a first representative embodiment of the present teachings.

A fuel tank unit according to a first representative embodiment of the present teachings will be described while referring to the drawings. The fuel tank unit of the present embodiment may be used in a motor vehicle. As shown in FIG. 1, the fuel tank unit comprises a fuel pump 10 and a fuel tank 11.

The fuel pump 10 supplies fuel to an engine of the motor vehicle. The fuel pump 10 is attached to the bottom 12 of the fuel tank 11. The fuel tank 11 may have a flat box shape. The fuel tank 11 may be made from resin material (e.g., plastic). When the vehicle goes around a curve or accelerates or decelerates, the level 13 of the fuel in the fuel tank 11 will change. Therefore, the fuel pump 10 is preferably located in the center region of the fuel tank 11 where the change in the depth of the fuel is stable even if the level 13 of the fuel in the fuel tank 11 changes.

The fuel tank 11 may comprise a fuel tank body 11a and a set plate (tank lid) 14. The fuel tank body 11a has a flat box shaped exterior and is formed such that a part of the top circumferential edge is beveled. An opening 11b is formed on the beveled region. The set plate 14 is attached to the opening 11b. A union 15 and an electrical connector 16 are fixed to the set plate 14. The union 15 and the fuel pump 10 are connected together by a fuel hose 20. The electrical connector 16 and the fuel pump 10 are connected by a wire harness 21. The fuel which is drawn into the fuel pump 10 flows through the fuel hose 20 and the union 15 and is pumped out of the fuel tank 11. The fuel which is pumped out of the fuel tank 11 is supplied to the engine. The fuel pump 10 is provided electrical power from the outside through the connector 16 and the wire harness 21.

Conventionally, the set plate was attached to the top surface of the fuel tank. Therefore, space above the fuel tank is required for the fuel hose which is externally connected through the union and the wire harness which is externally connected to the electrical connector. If the space above the fuel tank is used, the comfort of the vehicle will be hindered. As described above, the fuel tank 11 has a flat box shape and the set plate 14 is positioned at an angle in the region where part of the upper circumferential edge of the fuel tank has been beveled. Therefore, the fuel tank 11 of the present embodiment is flat and contributes to improved comfort in the vehicle by conserving the space above the fuel tank.

Figure 2:
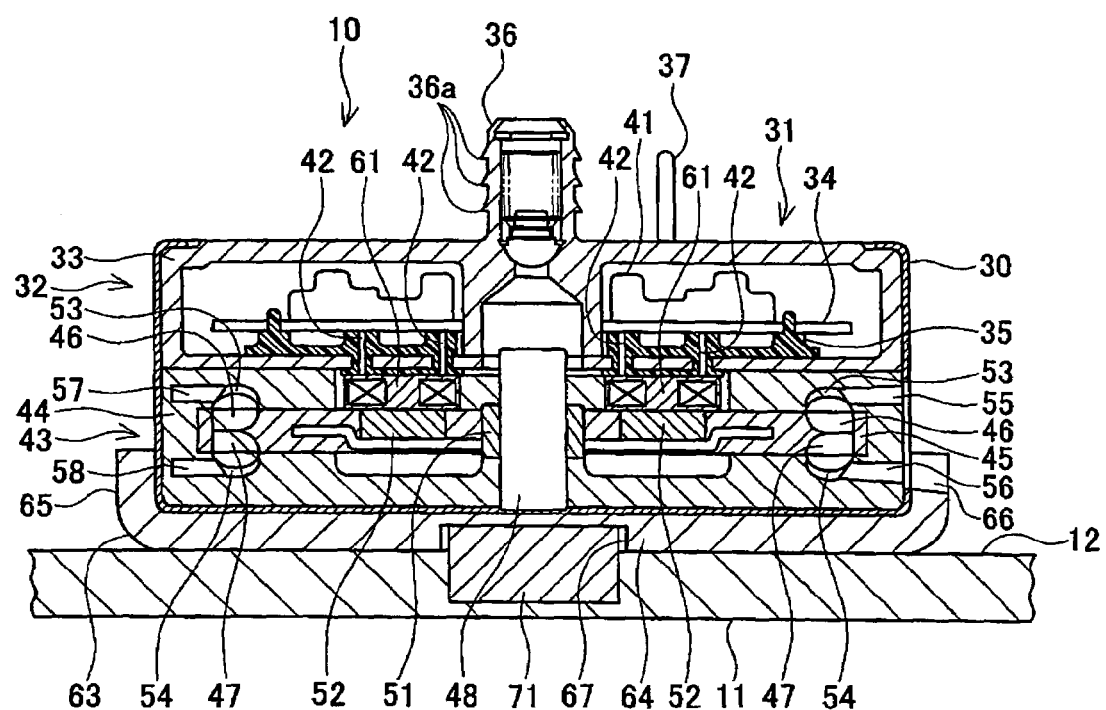
FIG. 2 is a vertical cross section diagram of a fuel pump and fuel tank of the first representative embodiment.

As shown in FIG. 2, the fuel pump 10 has a pump body 31. A pad 63 is attached to the bottom of the pump body 31. The pump body 31 is attached to the bottom 12 of the fuel tank 11 through the pad 63.

The pump body 31 comprises a housing 30, a circuit section 32, and a pump section 43. The housing 30 has a substantially cylindrical shape on the bottom, and the circuit section 32 and the pump section 43 are accommodated by crimping the top edge inward. The housing 30 may be made of steel.

The circuit section 32 comprises a circuit casing 33 and a circuit board 34. The circuit casing 33 has a discharge port 36 which opens facing upward. One end of the fuel hose 20 (shown in FIG. 1) is connected to the discharge port 36. A bead 36a extending in the circumferential direction is formed on the outside surface of the discharge port 36. The bead 36a is established in order to positively connect the fuel hose 20 to the discharge port 36, or in other words to prevent the fuel hose 20 from separating from the discharge port 36. A terminal 37 is established on the top surface of the circuit casing 33. One end of the wire harness 21 (shown in FIG. 1) is connected to the terminal 37.

The circuit board 34 is accommodated in the space inside the circuit casing 33 by means of a board base 35. A motor control circuit 41 is attached to the circuit board 34. The motor control circuit 41 converts the direct current power supplied from the outside through the terminal 37 into three-phase alternating current power. This alternating current power is supplied by an electrical power supply line 42 to a drive coil 61 (described later).

The pump section 43 comprises a pump casing 44 and an impeller 45. The pump casing 44 accommodates the impeller 45. The impeller 45 is formed in a substantially disc shape and is attached through a bearing 51 to a shaft 48 which is attached to the pump casing 44. A small gap is established between the pump casing 44 and the top, bottom, and outside circumferential surfaces of the impeller 45. Therefore, the impeller 45 rotates around the shaft 48 while accommodated in the pump casing 44. A group of concavities 46 and a group of concavities 47 are formed in upper and lower faces of the impeller 45. The group of concavities 46 and 47 extends along the circumference direction of the impeller 45. The concavities 46 and 47 are repeated in a circumference direction. Bottom portion of the pair of upper concavities 46 and lower concavities communicates via through-hole. A plurality of permanent magnets 52 is disposed in the impeller. The permanent magnets are located on the top side of the impeller 45 toward the inside of the concavities 46.

A top surface groove 53 which extends from the upstream end to the downstream end is formed on the surface opposite to the top surface of the impeller 45 of the pump casing 44 in the region corresponding to the group of concavities 46 of the impeller 45. The upstream end of the top surface groove 53 is connected through to the outside by an intake channel 55 which is formed in the pump casing 44. The downstream end of the top surface groove 53 is connected through to a discharge port 36 through a discharge channel 57 which is formed in the pump casing 44.

A bottom surface groove 54 which extends from the upstream end to the downstream end is formed on the surface opposite to the bottom surface of the impeller 45 of the pump casing 44 in the region corresponding to the group of concavities 47 of the impeller 45. The upstream end of the bottom surface groove 54 is connected through to the outside through the intake channel 56, and the downstream end is connected through to the discharge port 36 through the discharge channel 58.

Drive coils 61 is attached to the pump casing 44 in the region opposite the permanent magnets 52. As previously described, electrical power is supplied from the motor control circuit 41 through the power supply line 42 to the drive coils 61. When electrical power supplied to the drive coils 61, the impeller 45 will rotate because of the magnetic effect generated thereby.

When the impeller 45 rotates, fuel will circulate through each of the concavities 46 and the top surface groove 53. While circulating, the fuel flows from the upstream end of the top surface groove 53 to the downstream end, and is pressurized in the process. As a result, fuel from the outside will be drawn in through the intake channel 55, flow through the top channel groove 53 from the upstream end to the downstream end, and be discharged from the discharge channel 57. The fuel which is discharged from the discharge channel 57 is transferred to the discharge port 36, and is discharged from the discharge port 36 to the fuel hose 20. Similarly, fuel is also drawn into the intake channel 56, flows through the bottom surface groove 54 and is discharged from the discharge channel 58. The fuel which is discharged from the discharge channel 58 is transported to the discharge port 36, and is discharged from the discharge port 36 to the fuel hose 20.

Figure 3:
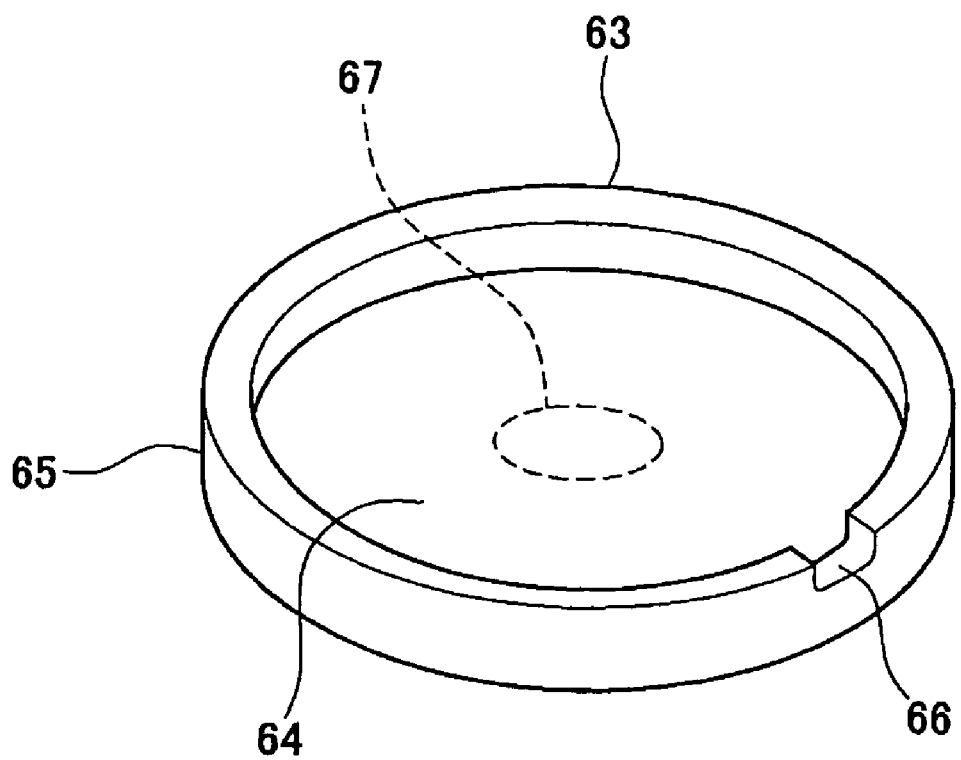
FIG. 3 is a perspective view diagram of a pad of the first representative embodiment.

The pad 63 is made from rubber, and as shown in FIG. 2 and FIG. 3, an upward facing lip 65 is established on the outer circumference of the disc shaped bottom 64. A notch 66 is formed in the lip 65. The notch 66 is located in a position which corresponds to the intake channel 56 of the pump body 31. Therefore, the lip 65 is prevented from plugging the intake channel 56. The inside diameter of the lip 65 is slightly smaller than the outside diameter of the pump body 31. Therefore, the pump body 31 is attached to the pad 63 by being press fit into the lip 65. Attaching the pump body 31 to the pad 63 is not restricted to press fitting, and for instance, an adhesive may also be used. A recess 67 which opens facing downward is formed in the bottom surface of the bottom 64. The lateral cross-section of the recess 67 is round.

The fuel tank 11 is made of plastic. As shown in FIG. 2, a magnet 71 is attached to the fuel tank 11 such that the top of the magnet protrudes from the bottom 12 of the fuel tank. The magnet 71 has a cylindrical shape and the outside diameter is slightly smaller than the inside diameter of the recess 67 in the pad 63. The magnet 71 may be attached to the bottom 12 of the fuel tank 11 by adhesive or press fitting or the like.

As previously described, the housing 30 of the pump body 31 is made of steel. Therefore, the housing 30 will be acted on by the magnetic attraction of the magnet 71 through the pad 63. The fuel pump 10 is fixed to the bottom 12 of the fuel tank 11 by the magnetic attraction of the magnet 71 on the housing 30.

As previously described, the set plate 14 of the fuel tank 11 is positioned in the region where a part of the upper circumferential edge of the fuel tank 11 was beveled. Furthermore, the fuel pump 10 is attached to the center of the bottom of the fuel tank 11. Therefore, an operator must attach the fuel pump 10 in a position deep within the fuel tank 11 when the set plate 14 is removed. As described above, a recess 67 is formed in the bottom 64 of the pad 63 and a magnet 71 protrudes out from the bottom 12 of the fuel tank 11. Therefore, by adjusting the position of the fuel pump 10 so that the protruding portion of the magnet 71 will fit into the recess 67 of the pad 63, the position of the fuel pump 10 can easily be set. Other operations are not required because the fuel pump 10 will be secured by the magnetic attraction of the magnet 71. With this type of construction, the fuel pump 10 can easily be attached in a position deep within the fuel tank 11, and therefore the cost will be inexpensive.

Conventionally, one end of the pump supporting member is attached to the set plate and the fuel pump is attached to the other end of the pump support member so the fuel pump is normally suspended down and positioned in the fuel tank. However, if the set plate is located in the region where the upper edge of the fuel tank has been beveled and the fuel pump is to be positioned at a location in the center of the bottom of the fuel tank, the length of the pump support member must be made longer. When the length of the pump support member is increased, the rigidity will be insufficient. Furthermore when the length of the pump support member is increased, the fuel pump will vibrate strongly when functioning. If the fuel pump vibrates strongly, large quantities of abrasion powder will be generated because of strong contact between the internal metal components. When large quantities of abrasion powder are generated, the fuel pump will be damaged. Furthermore, when the fuel pump vibrates strongly, the vibrations will transfer through the pump support member to the fuel tank and noise will be generated. However, rashly increasing the strength of the pump support member is impractical because of the cost or the like.

The fuel pump 10 of the present embodiment is attached to a fuel tank 11 through the pad 63. Therefore a pump support member is not necessary. Furthermore, the aforementioned problems caused by the length of the pump support member can be prevented. Moreover the pad 63 is made from rubber. Therefore, vibrations which transfer from the pump body 31 to the vehicle are reduced by the vibration absorbing effects of the pad 63. Therefore, the quietness of the vehicle can be enhanced.

It is also possible for magnet 71 to be attached to the pump body 31, and the region which is attracted by the magnet 71 may be on the fuel tank side.

[Second Representative Embodiment]

Descriptions which are duplicate with those of the first representative embodiment will be omitted, and only the content which is characteristic to the present embodiment will be described. (The same applies to the third through sixth representative embodiments which will be described later).

Figure 4:
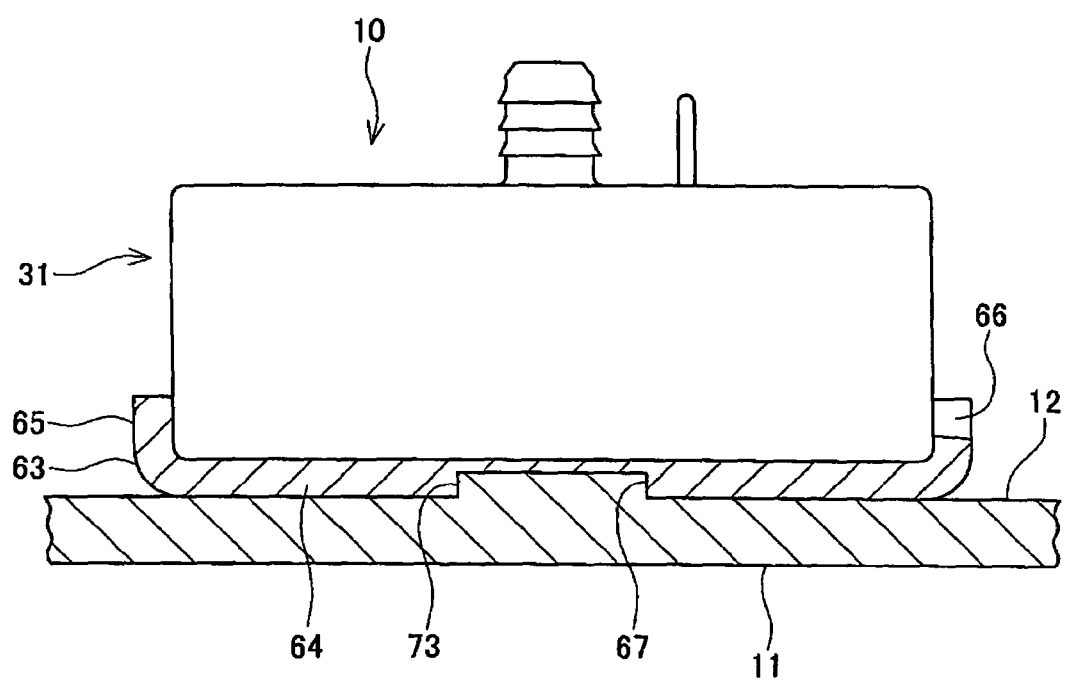
FIG. 4 is a vertical cross section diagram of a fuel pump and fuel tank of a second representative embodiment of the present teachings.

As shown in FIG. 4, an upward facing protruding part 73 is formed in the bottom 12 of the fuel tank 11. The protruding part 73 has a cylindrical shape and the diameter is slightly larger than the recess 67 in the pad 63. The fuel pump 10 is attached to the bottom 12 of the fuel tank 11 by press fitting the protruding part 73 of the fuel tank 11 into the recess 67 in the fuel pad 63. With this preferred embodiment, the fuel pump 10 can be attached to the fuel tank 11 by a simplified construction.

[Third Representative Embodiment]

Figure 5:
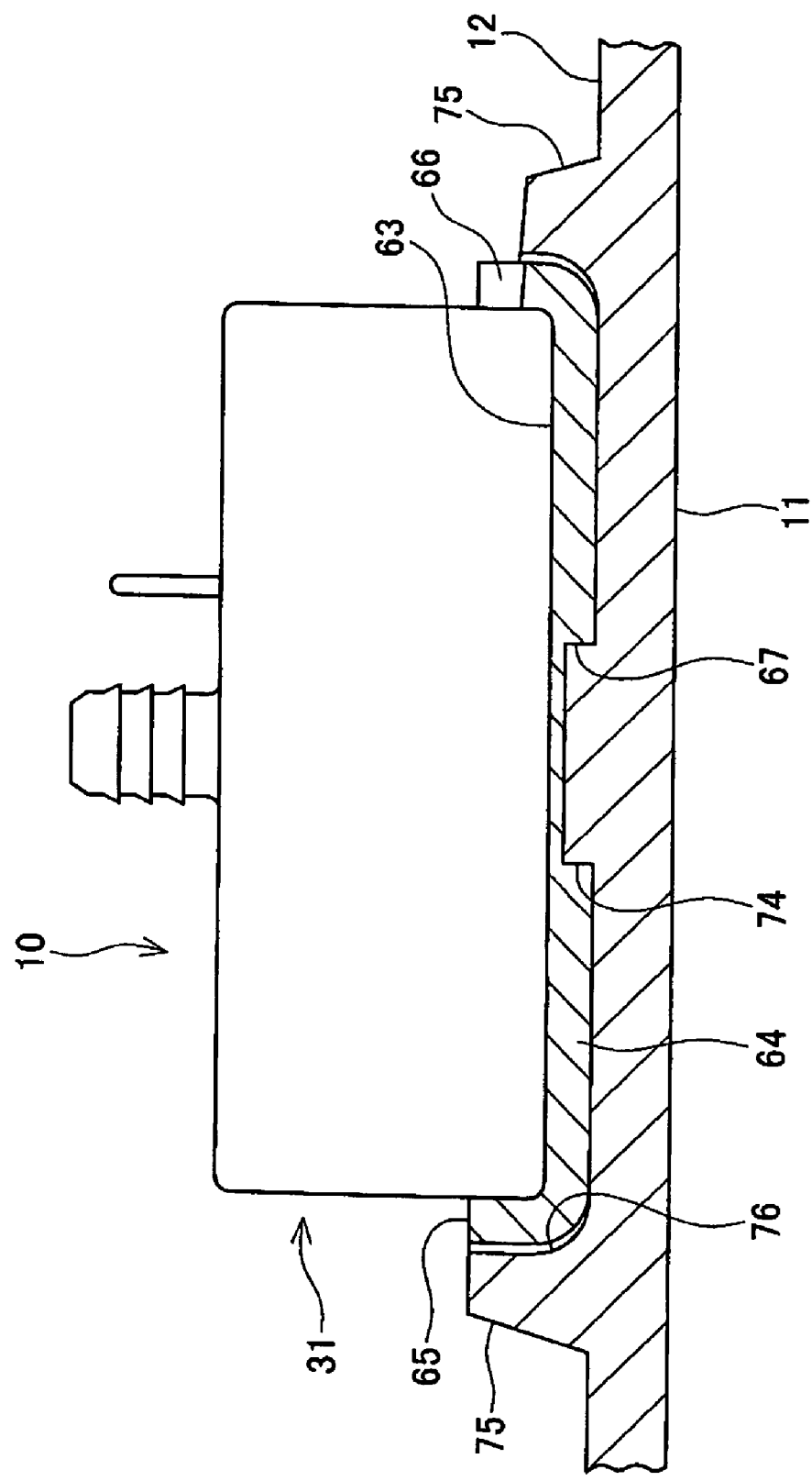
FIG. 5 is a vertical cross section diagram of a fuel pump and fuel tank of a third representative of the present teachings.

As shown in FIG. 5, a protruding part 74 is formed in the bottom 12 of the fuel tank 11, similar to the second representative embodiment. Furthermore, a tank recess 67 is formed in the bottom 12 of the fuel tank 11 by an upward protruding wall 75. The tank recess 76 has a cylindrical plane. The protruding wall 75 of the tank recess 76 is formed such that the side further from the set plate 14 (left-hand side in FIG. 5) is taller than the side near the set plate 14 (right hand side in FIG. 5). Therefore, when the operator attaches the fuel pump 10, the protruding wall 75 on the side further from the set plate 14 will function as a stopper, and the position of the fuel pump 10 can be more easily set. The fuel pump 10 is attached to the bottom 12 of the fuel tank 11 by press fitting the protruding part 74 of the fuel tank 11 into the recess 67 in the pad 63.

[Fourth Representative Embodiment]

Figure 6:
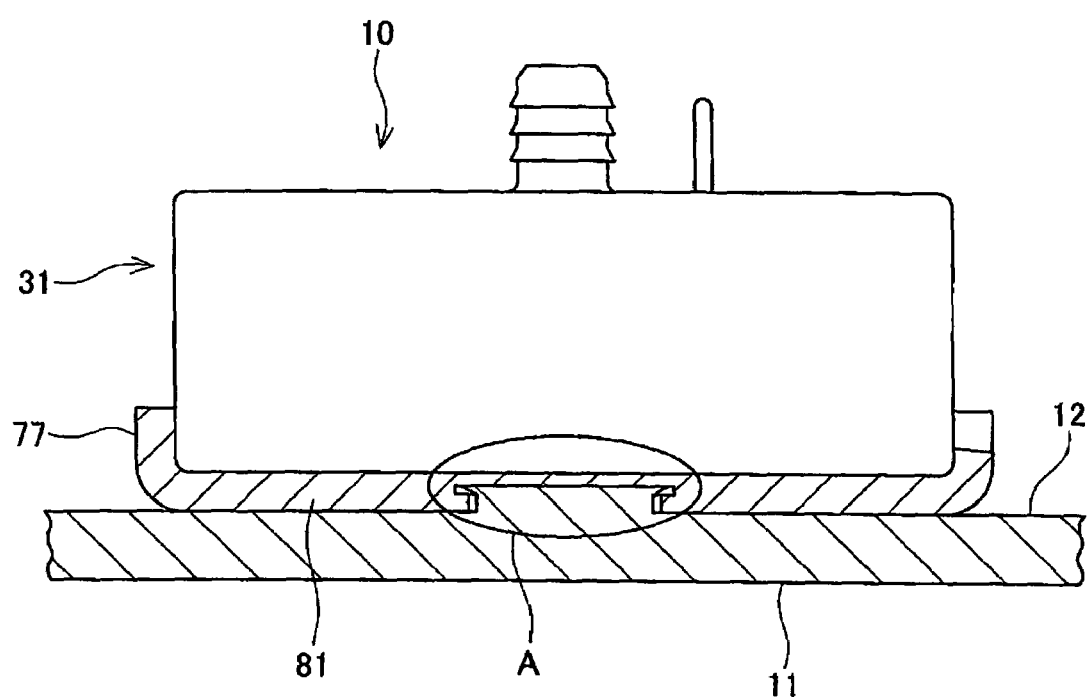
FIG. 6 is a vertical cross section diagram of a fuel pump and fuel tank of a fourth representative embodiment of the present teachings.
Figure 7:
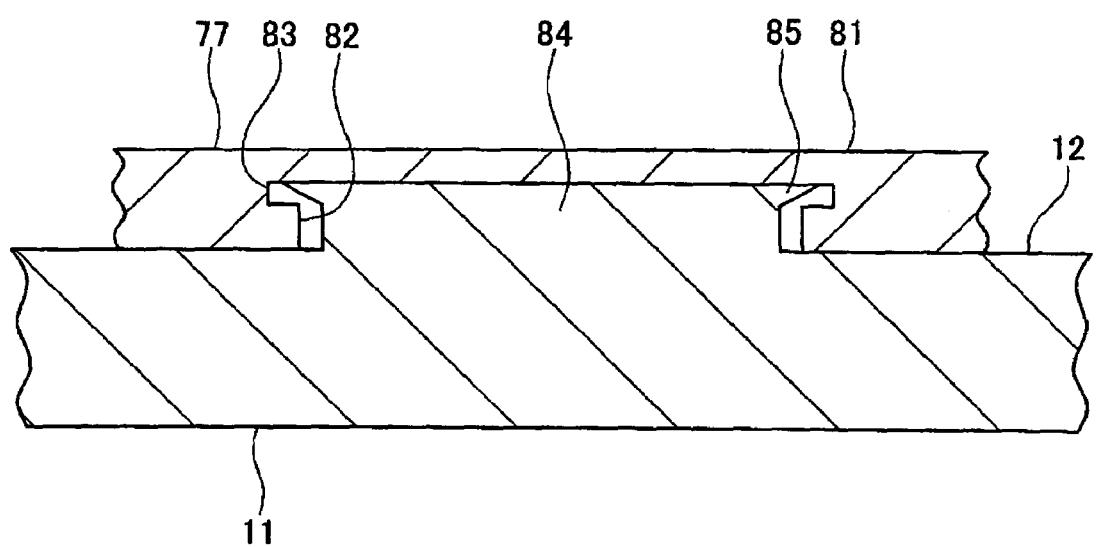
FIG. 7 is a detailed diagram of region A of FIG. 6.

As shown in FIG. 6, with this embodiment the fuel pump 10 is attached to the fuel tank 11 by locking the pad 77 of the fuel pump 10 into the bottom 12 of the fuel tank 11. FIG. 7 is a detailed diagram of section A of FIG. 6. As shown in FIG. 7, a recess 82 with a round lateral cross section is formed in the bottom 81 of the pad 77. The recess 82 has a locking groove 83 which extends circumferentially. A protrusion 84 with a round lateral cross section is formed in the bottom 12 of the fuel tank 11. A lip shaped locking hook 85 is formed in the top edge of the protrusion 84. The fuel pump 10 is secured to the fuel tank 11 by locking the locking hook 85 of the fuel tank 11 into the locking groove 83 of the pad 77.

In addition to the aforementioned configuration, the protruding wall 75 shown in the third representative embodiment may be formed in the fuel tank 11. If a protruding wall 75 is established, determining the position for locking the locking hook 85 of the fuel tank 11 to the locking groove 83 of the pad 77 will be simplified.

[Fifth Representative Embodiment]

Figure 8:
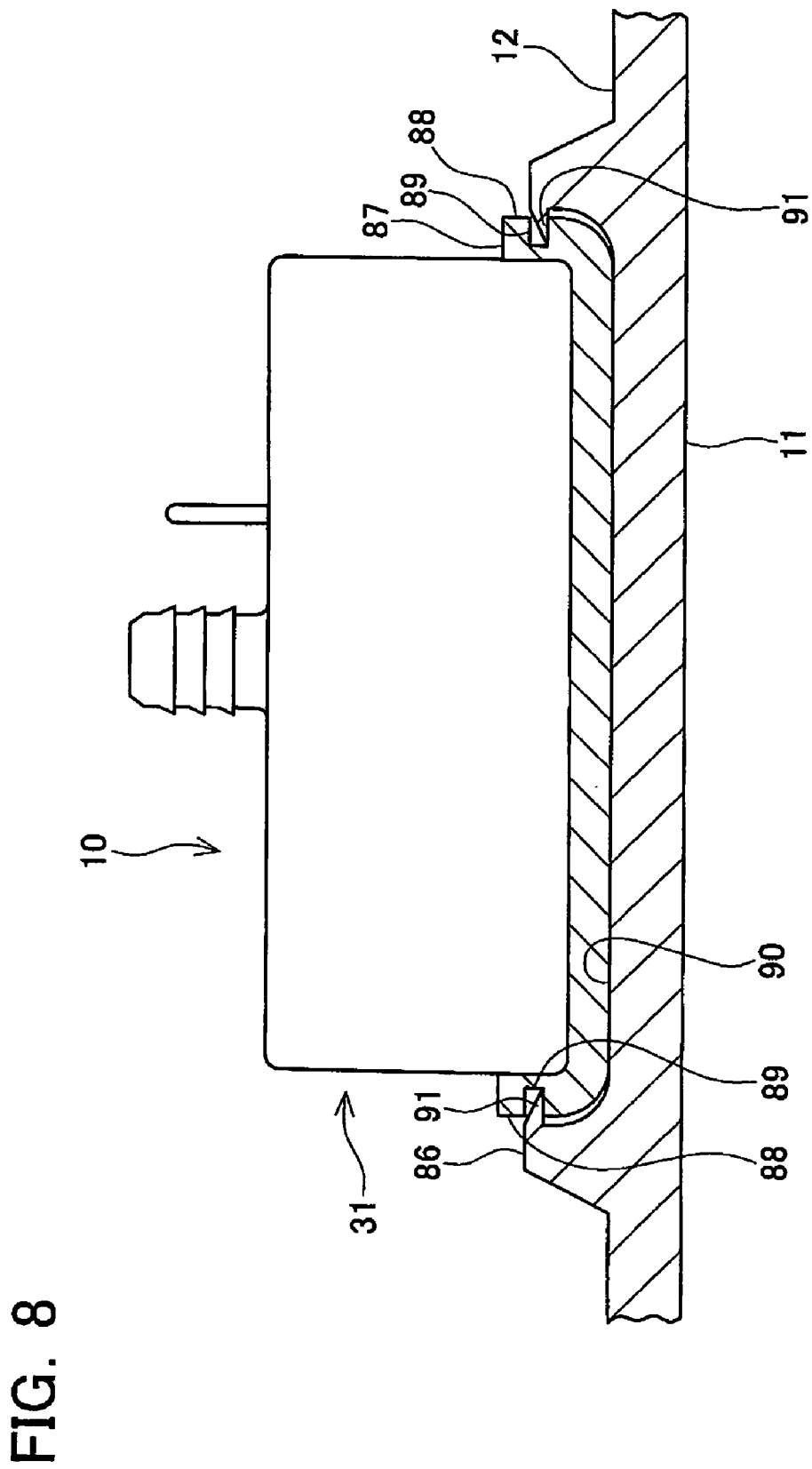
FIG. 8 is a vertical cross section diagram of a fuel pump and fuel tank of a fifth representative embodiment of the present teachings.

As shown in FIG. 8, an upward facing edge 88 is formed in the pad 87. A locking groove 89 which extends in the circumferential direction is formed in the outer circumference of the edge of the edge 88. A tank recess 90 is formed by a protruding wall 86 and the bottom 12 of the fuel tank 11. The planar configuration of the tank recess 90 is round. A locking hook 91 which extends in the circumferential direction is formed in the top end of the protruding wall 86. The fuel pump 10 is secured to the fuel tank 11 by locking the locking hook 91 of the fuel tank 11 into the locking groove 89 of the pad 87.

[Sixth Representative Embodiment]

As shown in FIG. 9, a major portion of the pump body 31 of the fuel pump 10 is covered by a rubber vibration absorbing cover 92. A fuel filter 93 is inserted into a side opening 92a in the vibration absorbing cover 92. A hook receiving unit 94 is formed in the bottom edge of the vibration absorbing cover 92. A tank recess 96 is formed by a protruding wall 95 in the bottom 12 of the fuel tank 11. The planar configuration of the tank recess 96 is round. A locking hook 99 which extends circumferentially is formed in the top edge of the protruding wall 95. The fuel pump 10 is secured to the fuel tank 11 by locking the locking hook 99 into the hook accepting unit 94. The pump body 31 is covered by the vibration absorbing cover 92, so the amount of vibration of the fuel pump 10 which is transferred externally will be reduced, and vehicle quietness will be further enhanced.

Finally, although the preferred representative embodiments have been described in detail, the present embodiments are for illustrative purpose only and not restrictive. It is to be understood that various changes and modifications may be made without departing from the spirit or scope of the appended claims. In addition, the additional features and aspects disclosed herein also may be utilized singularly or in combination with the above aspects and features.

The invention claimed is:

1. A fuel tank unit, comprising:
    a fuel tank comprising a fuel tank body and a lid, wherein the fuel tank body has a flat box shaped exterior, wherein at least a portion of the top circumferential edge of the outside of the fuel tank body is beveled, and wherein the lid is attached to the beveled region of the fuel tank body;
    a fuel pump attached to the bottom of the inside of the fuel tank body, the fuel pump being located substantially at the center of the inside bottom of the fuel tank body; and
    a pad located between the fuel tank and the fuel pump, wherein the pad is made from rubber.

2. A fuel tank unit as in claim 1, wherein the fuel pump has a substantially disc shaped impeller and a casing which rotatably accommodates the impeller, wherein the pad is formed as a sheet, and wherein the casing of the fuel pump is attached to the top surface of the pad.

3. A fuel tank unit as in claim 2, wherein a fuel intake opening is formed in the side surface of the fuel pump casing.

4. A fuel tank unit as in claim 1, wherein the fuel pump is attached to the fuel tank by the attractive force of a magnet which is attached to the bottom of the fuel tank body.

5. A fuel tank unit as in claim 1, wherein a recess is formed in one of either the fuel tank or the pad, wherein a protrusion is formed in the other of either the fuel tank or the pad, and wherein the pad is attached to the fuel tank by the protrusion being press-fit into the recess.

6. A fuel tank unit as in claim 1, wherein a hook receiving unit is formed in one of either the fuel tank or the pad, wherein a locking hook is formed in the other of either the fuel tank or the pad, and wherein the pad is attached to the fuel tank by hooking the locking hook into the hook receiving unit.

7. A fuel tank unit as in claim 1, wherein the fuel tank further comprise a member for determining the position of the pad, the member being formed in the bottom of the fuel tank body.

8. A fuel tank unit, comprising:
    a fuel tank comprising a fuel tank body and a lid, wherein the fuel tank body has a flat box shaped exterior, wherein at least a portion of the top circumferential edge of the outside of the fuel tank body is beveled, and wherein the lid is attached to the beveled region of the fuel tank body;
    a fuel pump attached to the bottom of the inside of the fuel tank body, the fuel pump being located substantially at the center of the inside bottom of the fuel tank body, wherein the fuel pump has a substantially disc shaped impeller and a casing which rotatably accommodates the impeller; and
    a pad located between the fuel tank and the fuel pump, wherein the pad is formed as a sheet, and wherein the casing of the fuel pump is attached to the top surface of the pad.

9. A fuel tank unit, comprising:
    a fuel tank comprising a fuel tank body and a lid, wherein the fuel tank body has a flat box shaped exterior, wherein at least a portion of the top circumferential edge of the outside of the fuel tank body is beveled, and wherein the lid is attached to the beveled region of the fuel tank body;
    a fuel pump attached to the bottom of the inside of the fuel tank body, the fuel pump being located substantially at the center of the inside bottom of the fuel tank body;
    a pad located between the fuel tank and the fuel pump; and a magnet attached to the bottom of the fuel tank body, wherein the fuel pump is attached to the bottom of the inside of the fuel tank body by the attractive force of the magnet.

10. A fuel tank unit, comprising:

a fuel tank comprising a fuel tank body and a lid, wherein the fuel tank body has a flat box shaped exterior, wherein at least a portion of the top circumferential edge of the outside of the fuel tank body is beveled, and wherein the lid is attached to the beveled region of the fuel tank body;

a fuel pump attached to the bottom of the inside of the fuel tank body, the fuel pump being located substantially at the center of the inside bottom of the fuel tank body; and a pad located between the fuel tank and the fuel pump, wherein a recess is formed in one of either the fuel tank or the pad, wherein a protrusion is formed in the other of either the fuel tank or the pad, and wherein the pad is attached to the fuel tank by the protrusion being press-fit into the recess.

11. A fuel tank unit, comprising:

a fuel tank comprising a fuel tank body and a lid, wherein the fuel tank body has a flat box shaped exterior, wherein at least a portion of the top circumferential edge of the outside of the fuel tank body is beveled, and wherein the lid is attached to the beveled region of the fuel tank body;

a fuel pump attached to the bottom of the inside of the fuel tank body, the fuel pump being located substantially at the center of the inside bottom of the fuel tank body; and a pad located between the fuel tank and the fuel pump, wherein a hook receiving unit is formed in one of either the fuel tank or the pad, wherein a locking hook is formed in the other of either the fuel tank or the pad, and wherein the pad is attached to the fuel tank by hooking the locking hook into the hook receiving unit.

* * * * *